United States Patent [19]
Engel et al.

[11] Patent Number: 4,811,087
[45] Date of Patent: Mar. 7, 1989

[54] CLAMPING CIRCUIT FOR A TELEVISION TRANSMISSION SYSTEM

[75] Inventors: Ludovicus H. M. Engel; Pieter C. Pieket Weeserik; Geert Winters, all of Hilversum, Netherlands

[73] Assignees: AT&T; Philips Telecommunications B.V., both of Hilversum, Netherlands

[21] Appl. No.: 151,343

[22] Filed: Feb. 2, 1988

[30] Foreign Application Priority Data

Feb. 9, 1987 [NL] Netherlands .......................... 8700294

[51] Int. Cl.$^4$ .............................................. H04N 5/21
[52] U.S. Cl. ...................................... 358/36; 358/167; 358/172
[58] Field of Search ................. 358/36, 167, 172, 174, 358/186, 187, 160

[56] References Cited

U.S. PATENT DOCUMENTS

| | | | |
|---|---|---|---|
| 4,218,706 | 8/1980 | Brinegar | 358/172 |
| 4,486,781 | 12/1984 | Wilmer | 358/167 |
| 4,680,624 | 7/1987 | Murakami | 358/36 |
| 4,689,680 | 8/1987 | Bahrle | 358/172 |

Primary Examiner—Tommy P. Chin
Attorney, Agent, or Firm—Lucian C. Canepa

[57] ABSTRACT

A clamping circuit for a television transmission system, includes an input amplifier whose non-inverting input is connected to the input of the clamping circuit and whose output is connected to the output of the clamping circuit. A negative feedback loop is provided between the output of the clamping circuit and the inverting input of the input amplifier, the negative feedback loop including the series arrangement of a sample and hold circuit and two amplifiers functioning as integrators. A switchable filter switched by the same pulse which switches the sample and hold circuit is provided between the output of the clamping circuit and the signal input terminal of the sample and hold circuit.

4 Claims, 1 Drawing Sheet

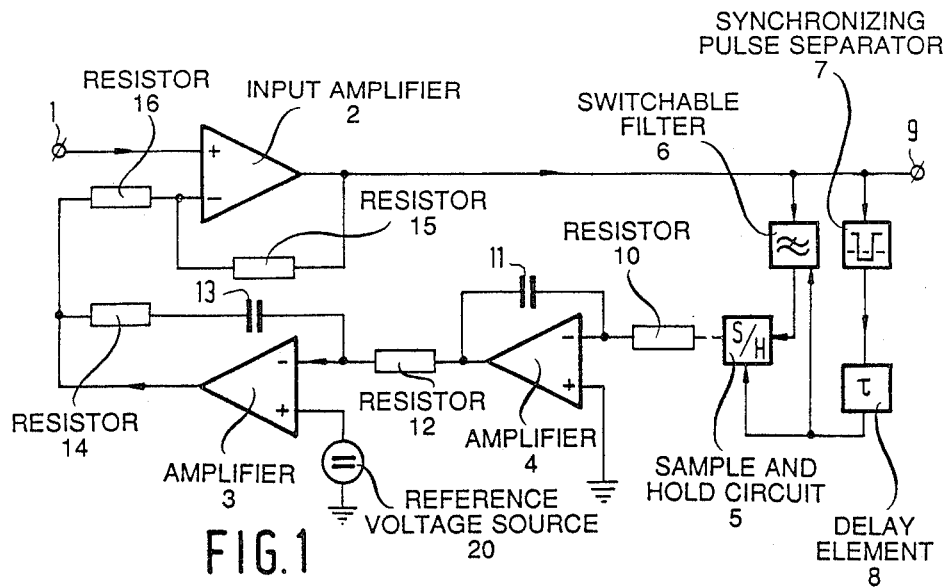
FIG. 1
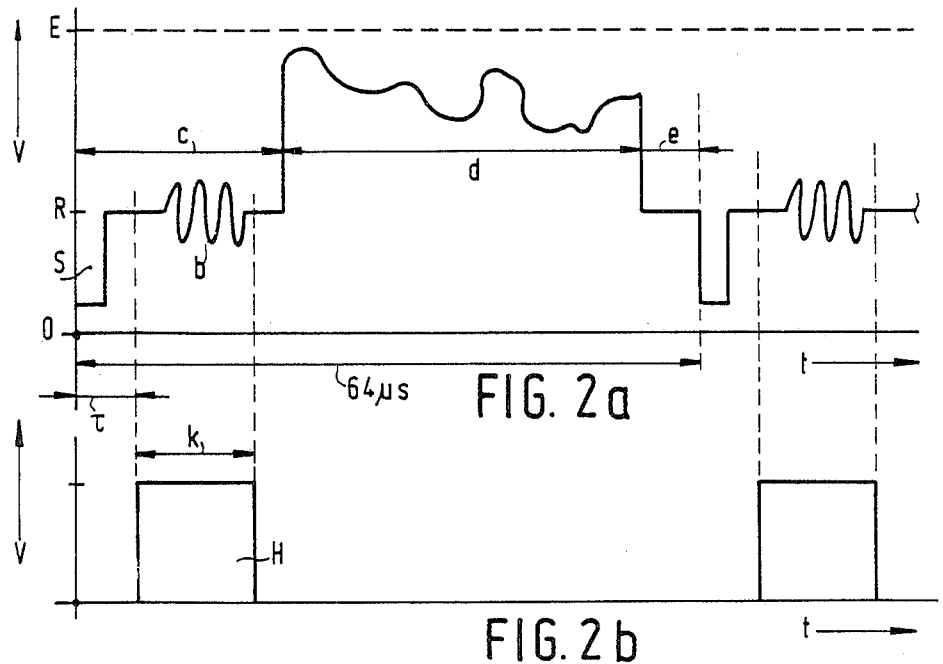
FIG. 2a
FIG. 2b

CLAMPING CIRCUIT FOR A TELEVISION TRANSMISSION SYSTEM

BACKGROUND OF THE INVENTION

The invention relates to a clamping circuit for a television transmission system, including an input amplifier whose non-inverting input is connected to the input of the clamping circuit and whose output is connected to the output of the clamping circuit, a negative feedback loop being arranged between the output of the clamping circuit and the inverting input of the input amplifier, the negative feedback loop comprising at least the series arrangement of a sample and hold circuit and a first amplifier functioning as an integrator.

In principle, the frequency band of a video signal starts at 0 Hz. The low-frequency content of the video signal is lost by filter action in the transmission system. To remedy this, clamping circuits are used in video transmission systems, which provide that the low-frequency content of the video signal is restored. More specifically, in digital television systems, an appropriate clamping circuit providing a high degree of hum reduction is required to enable utilization of the whole overall range of an analog-to-digital converter arranged subsequent to the clamping circuit.

If the video signal is beset with noise, the clamping level of the clamping circuit is influenced, because the hold capacitor in the sample and hold circuit is not always charged to the same level. The average value per picture remains indeed the same, but the level of each line changes continuously because the hold capacitor is always given a different final value. The feedback tries to correct this, which has for its result that the output signal varies step-wise. This becomes evident in the picture by brightness differences of identical lines, which produces a streaky picture.

SUMMARY OF THE INVENTION

The present invention has for its object to provide a solution for this problem and is characterized in that a switchable filter switched by the same pulse switching the sample and hold circuit is arranged between the output of the clamping circuit and the signal input of the sample and hold circuit, the negative feedback loop including a second amplifier which functions as an integrator and is provided between the output of the first amplifier and the inverting input of the input amplifier.

BRIEF DESCRIPTION OF THE DRAWING

The invention and how it can be put into effect will now be described in greater detail with reference to the accompanying drawing.

FIG. 1 shows an embodiment of the clamping circuit according to the invention.

FIGS. 2a and 2b are voltage diagram to explain the operation of the clamping circuit.

DETAILED DESCRIPTION

In the embodiment shown in FIG. 1, reference numeral 1 denotes the non-inverting input of an input amplifier 2 which is connectable to a television camera. The output of the input amplifier 2 is connected to the output 9 of the clamping circuit, which is connectable to the input of an analog-to-digital converter. The output of the input amplifier 2 is also connected to the control input of a sample and hold circuit 5 via the series arrangement of a synchronizing pulse separator 7 and a delay element 8. In addition, the output of the input amplifier 2 is connected to the signal input of the sample and hold circuit 5 via a switchable filter 6. The output of the sample and hold circuit 5 is connected via a resistor 10 to the inverting input of a first amplifier 4 whose non-inverting input is connected to ground. A capacitor 11 is provided between the inverting input and the output of the first amplifier 4. The output of the first amplifier is also connected via a resistor 12 to the inverting input of a second amplifier 3 whose non-inverting input is connected to ground via a reference voltage source 20. A series arrangement of capacitor 13 and resistor 14 is arranged between the inverting input of the second amplifier 3 and its output. The output of the second amplifier 3 is connected to the inverting input of the input amplifier 2 via a resistor 16. The inverting input of the input amplifier 2 is also connected to the output 9 via a resistor 15.

FIG. 2a shows schematically the structure of a normal television signal. The video signal is formed from synchronizing pulses S, color bursts b and a portion d for picture information. The portion c is commonly referred to as the back porch and the portion e as the front porch. It has been found that the color burst b is the only portion of the video signal which is always in the same position. By feeding-back only an averaged sample of the portion around the color bursts instead of the entire video signal, the position between two samples can be fixed. In the negative feedback loop of the clamping circuit, the sample and hold circuit 5 is preceded by a low-pass filter 6. This filter is used to suppress the high-frequency signal portions and the prevailing noise as much as possible when the sample and hold circuit is operative. Suppressing the high-frequency portion and noise is necessary, since the clamping circuit turns these signals into a low-frequency signal, which gives rise to a clearly visible interference in the picture. At a signal-to-noise ratio of, for example, 20 dB, clearly visible black horizontal streaks are produced in the picture, which is highly undesirable. Consequently, a signal whose variations within a sampling interval are minimal must be applied to the sample and hold circuit 5. So as to give the low-pass filter 6 a sufficiently low cut-off level, without affecting the synchronizing pulse shape, the filter 6 is implemented as a switchable filter which is switched on after the synchronizing pulse has occurred. The synchronizing pulses S are separated from the video signal with the aid of the synchronizing pulse separator 7. These synchronizing pulses are thereafter applied to the control inputs of the sample and hold circuit 5 and the filter 6 via a delay element 8. The time delay of the delay element 8 is set such that the beginning of the hold pulse H occurs after the synchronizing pulse S, and the interval k during which the hold pulse occurs, is chosen such that the entire color burst b is encompassed, see FIG. 2.

The output signal coming from the output of the sample and hold circuit 5 is applied to the inverting input of the input amplifier 2 via the first amplifier 4 which functions as an integrator and the second amplifier 3 which also functions as an integrator. The input signal of the second amplifier 3 is a d.c. voltage (clamping level) having a level equal to R, see FIG. 2a. The video signal can be adjusted to any desired level R and consequently the video signal can be optimally positioned in the window O-e of an analog-to-digital converter, see FIG. 2a. The two integrators each ensure a 20 dB hum reduction, so that the total hum reduction is 40 dB. The use of the switchable filter 6 in the negative feedback loop provides a significant improvement in the behaviour of the clamping circuit in the presence of noise. Since the filter 6 is included in the negative feedback loop, the phase margin must be closely watched. As the filter is only operative during the sampling period, there are no stability problems.

What is claimed is:

1. A clamping circuit for a television transmission system, including an input amplifier whose non-inverting input is connected to the input of the clamping circuit and whose output is connected to the output of the clamping circuit, a negative feedback loop being arranged between the output of the clamping circuit and the inverting input of the input amplifier, the negative feedback loop comprising at least a series arrangement of a sample and hold circuit and first amplifier functioning as an integrator, the sample and hold circuit having a signal input terminal and a control input terminal, characterized in that a switchable filter switched by a pulse that is also applied to the control input terminal of the sample and hold circuit is arranged between the output of the clamping circuit and the signal input terminal of the sample and hold circuit, the negative feedback loop including a second amplifier which functions as an integrator and is provided between the output of the first amplifier and the inverting input of the input amplifier.

2. A clamping circuit as claimed in claim 1, characterized in that a series arrangement of a synchronizing pulse separator and a delay element is provided between the output of said clamping circuit and the control input terminal of the sample and hold circuit.

3. A clamping circuit as claimed in claim 1 or 2, the back porch of a television signal containing a synchronizing pulse and a color burst, in that order, characterized in that said clamping circuit further includes means for applying signals both to said switchable filter to switch it on and to the control input terminal of said sample and hold circuit after the occurrence of said synchronizing pulse and for an interval of time that encompasses said color burst.

4. A clamping circuit as claimed in claim 1 or 2, characterized in that the switchable filter is a low-pass filter.

* * * * *